(12) United States Patent
Coyne et al.

(10) Patent No.: US 11,295,555 B2
(45) Date of Patent: Apr. 5, 2022

(54) SYSTEMS AND METHODS FOR ANALYZING MACHINE PERFORMANCE

(71) Applicant: Georgia-Pacific LLC, Atlanta, GA (US)

(72) Inventors: Samuel Lee Coyne, Smyrna, GA (US); Roshan Shah, Sandy Springs, GA (US)

(73) Assignee: Georgia-Pacific LLC, Atlanta, GA (US)

( * ) Notice: Subject to any disclaimer, the term of this patent is extended or adjusted under 35 U.S.C. 154(b) by 0 days.

(21) Appl. No.: 17/019,108

(22) Filed: Sep. 11, 2020

(65) Prior Publication Data
US 2021/0082206 A1     Mar. 18, 2021

Related U.S. Application Data

(60) Provisional application No. 62/899,181, filed on Sep. 12, 2019.

(51) Int. Cl.
*G07C 3/00* (2006.01)
*G05B 19/418* (2006.01)
*G07C 3/02* (2006.01)

(52) U.S. Cl.
CPC ......... *G07C 3/005* (2013.01); *G05B 19/4183* (2013.01); *G05B 19/41865* (2013.01); *G07C 3/02* (2013.01)

(58) Field of Classification Search
CPC . G07C 3/00; G07C 3/005; G07C 3/02; G05B 19/4183; G05B 19/41865; G05B 2219/37435; G05B 19/4184; Y02P 90/02
See application file for complete search history.

(56) References Cited

U.S. PATENT DOCUMENTS

| 8,450,984 | B2 * | 5/2013 | Sandrana | G01R 31/343 322/33 |
| 10,351,150 | B1 * | 7/2019 | Lederman | B61L 25/025 |
| 2006/0265153 | A1 * | 11/2006 | Astley | G01M 13/045 702/56 |
| 2009/0100293 | A1 * | 4/2009 | LaComb | G05B 23/0229 714/26 |
| 2011/0013479 | A1 * | 1/2011 | Chaudhuri | B01F 9/0001 366/220 |

(Continued)

FOREIGN PATENT DOCUMENTS

WO     WO 2020088959 A1 *  5/2020  ............. H02H 7/001

*Primary Examiner* — Tung S Lau

(57) ABSTRACT

Methods, systems, and devices for analyzing vibration data and for identifying and tracking vibration anomalies in industrial machines are described. In various embodiments, the system described herein collects, transforms, and analyzes sensor data from one or more machines, such as industrial machines. The system may identify one or more sensors that are experiencing vibrational anomalies. In various embodiments, the system: collects and analyzes vibration data for a set of one or more vibration-related sensors of one or more industrial machines; determines an occurrence of one or more anomalies based on the vibration data as compared to a threshold; tracks anomalies in collected vibration data for the one or more industrial machines of the facility; generates a report of vibration data for the one or more vibration-related sensors of the facility; and reports industrial machines in the facility that may deviate from a target performance.

34 Claims, 14 Drawing Sheets

(56) References Cited

U.S. PATENT DOCUMENTS

2012/0105021 A1\* 5/2012 Sandrana ............. G01R 31/343
                                                    322/99
2021/0326759 A1\* 10/2021 Ardel ................... G05D 7/0676

\* cited by examiner parent_key1 + parent_key2 + parent_key3 + parent_key4 + parent_key5 + parent_key6 + parent_key7 + parent_key8 — 205

CONCATENATION

| tag_name | parent_key1 | parent_key2 | parent_key3 | parent_key4 | parent_key5 | parent_key6 | parent_key7 | parent_key8 | sensortype | tag_value |
|---|---|---|---|---|---|---|---|---|---|---|
| Overall Velocity | Allendale | A080200 Surface Blender | NW Bearing | X | | | | | VibrationXAxis | 0.03 |
| Overall Velocity | Allendale | A921530 FCOS #2 | Shuttle Motor 18 | Vertical | | | | | VibrationXAxis | 0.16 |
| Overall Velocity | Allendale | A111152 Heat Src 1 Sec Fan | Fan Inboard | X | | | | | VibrationXAxis | 0.06 |
| Overall Velocity | Allendale | Cyclone Out-feed Conveyor | Cyclone #1 Conv #2 | Cyclone 1 Outfeed 2 B3 | Horizontal | | | | VibrationXAxis | 0.03 |
| Overall Velocity | Allendale | A060171 Dryer #1 ID Fan | Fan Inboard | Y (Horizontal) | | | | | VibrationXAxis | 0.02 |
| Overall Velocity | Allendale | Cyclone Out-feed Conveyor | Cyclone #12Conv #2 | Cyclone 2 Outfeed 2 B1 | Horizontal | | | | VibrationXAxis | 0.02 |
| Overall Velocity | Allendale | A140111 #1A Baghouse Fan | Fan Outboard | Horizontal | | | | | VibrationXAxis | 0 |
| Overall Velocity | Allendale | Hog | A133000 MAIN Motor #1 IB | Y | | | | | VibrationXAxis | 0.04 |
| Overall Velocity | Allendale | A922880 Tipple Conveyor | South Tipple Bearing #3 | Y | | | | | VibrationXAxis | 0.08 |
| Overall Velocity | Allendale | Cyclone out-feed Conveyor | Cyclone #1 Conv#2 | Cyclone 1 Outfeed 2 Motor | Horizontal | | | | VibrationXAxis | 0.03 |

*FIG. 2*

| dim_facility_key | day | hour | indicatortype | DryingDryingBasement1Mill051301NChestNBtmAgitAgitatorIB |
|---|---|---|---|---|
| 4820 | 1.0 | 15.0 | VibrationOverallPeakAccel | 0.136313 |
| 4417 | 1.0 | 16.0 | VibrationOverallPeakAccel | 0.160831 |
| 6757 | 1.0 | 17.0 | VibrationOverallPeakAccel | 0.149312 |
| 287 | 1.0 | 18.0 | VibrationOverallPeakAccel | 0.130150 |
| 5619 | 1.0 | 19.0 | VibrationOverallPeakAccel | 0.085171 |
| 1602 | 1.0 | 20.0 | VibrationOverallPeakAccel | 0.085171 |
| 4824 | 1.0 | 21.0 | VibrationOverallPeakAccel | 0.085171 |
| 3142 | 1.0 | 22.0 | VibrationOverallPeakAccel | 0.085171 |
| 5558 | 1.0 | 23.0 | VibrationOverallPeakAccel | 0.085171 |
| 3763 | 2.0 | 0.0 | VibrationOverallPeakAccel | 0.085171 |

Interpreted as Missing Values 505

605 —
```
matrix([[ 3.30000000e+01,  1.00000000e+00,  0.00000000e+00, ...,
          8.07654512e-01,  1.38907256e+00,  1.00000000e+00],
        [ 3.30000000e+01,  1.00000000e+00,  1.00000000e+00, ...,
          8.07654512e-01,  1.38907256e+00,  2.00000000e+00],
        [ 3.30000000e+01,  1.00000000e+00,  2.00000000e+00, ...,
          8.07654512e-01,  1.38907256e+00,  3.00000000e+00],
        ...,
        [ 3.30000000e+01,  5.10000000e+01,  2.00000000e+01, ...,
          1.32149277e+00,  1.84657578e+00,  1.20200000e+03],
        [ 3.30000000e+01,  5.10000000e+01,  2.10000000e+01, ...,
          1.36485289e+00,  1.71932529e+00,  1.20300000e+03],
        [ 3.30000000e+01,  5.10000000e+01,  2.20000000e+01, ...,
          1.36485289e+00,  1.71932529e+00,  1.20400000e+03]])
```
Peak Acceleration Matrix (continuous data type)

610 —
```
matrix([[ 3.30000000e+01,  1.00000000e+00,  0.00000000e+00, ...,
          6.69898750e-02,  4.94834341e-02,  1.00000000e+00],
        [ 3.30000000e+01,  1.00000000e+00,  1.00000000e+00, ...,
          6.69898750e-02,  4.94834341e-02,  2.00000000e+00],
        [ 3.30000000e+01,  1.00000000e+00,  2.00000000e+00, ...,
          6.69898750e-02,  4.94834341e-02,  3.00000000e+00],
        ...,
        [ 3.30000000e+01,  5.10000000e+01,  2.00000000e+01, ...,
          6.41599250e-02,  5.16272250e-02,  1.20200000e+03],
        [ 3.30000000e+01,  5.10000000e+01,  2.10000000e+01, ...,
          6.44277500e-02,  5.16664833e-02,  1.20300000e+03],
        [ 3.30000000e+01,  5.10000000e+01,  2.20000000e+01, ...,
          6.44277500e-02,  5.16664833e-02,  1.20400000e+03]])
```
Overall Velocity Matrix (continuous data type)

615 —
```
matrix([[ 3.30000000e+01,  1.00000000e+00,  0.00000000e+00, ...,
          4.85408014e-02,  3.68445200e-02,  1.00000000e+00],
        [ 3.30000000e+01,  1.00000000e+00,  1.00000000e+00, ...,
          4.85408014e-02,  3.68445200e-02,  2.00000000e+00],
        [ 3.30000000e+01,  1.00000000e+00,  2.00000000e+00, ...,
          4.85408014e-02,  3.68445200e-02,  3.00000000e+00],
        ...,
        [ 3.30000000e+01,  5.10000000e+01,  2.00000000e+01, ...,
          4.69220417e-02,  3.65453083e-02,  1.20200000e+03],
        [ 3.30000000e+01,  5.10000000e+01,  2.10000000e+01, ...,
          4.66877583e-02,  3.84717083e-02,  1.20300000e+03],
        [ 3.30000000e+01,  5.10000000e+01,  2.20000000e+01, ...,
          4.66877583e-02,  3.84717083e-02,  1.20400000e+03]])
```
RMS Matrix (continuous data type)

910
```
matrix([[ 3.30000000e+01,   1.00000000e+00,   0.00000000e+00, ...,
          4.85408014e-02,   3.68445200e-02,   1.00000000e+00],
        [ 3.30000000e+01,   1.00000000e+00,   1.00000000e+00, ...,
          4.85408014e-02,   3.68445200e-02,   2.00000000e+00],
        [ 3.30000000e+01,   1.00000000e+00,   2.00000000e+00, ...,
          4.85408014e-02,   3.68445200e-02,   3.00000000e+00],
        ...,
        [ 3.30000000e+01,   5.10000000e+01,   2.00000000e+01, ...,
          4.69220417e-02,   3.65453083e-02,   1.20200000e+03],
        [ 3.30000000e+01,   5.10000000e+01,   2.10000000e+01, ...,
          4.66877583e-02,   3.84717083e-02,   1.20300000e+03],
        [ 3.30000000e+01,   5.10000000e+01,   2.20000000e+01, ...,
          4.66877583e-02,   3.84717083e-02,   1.20400000e+03]])
```

↓ Penalization Process

905
```
array([[0.,   0.,   0.,   ...,   0.,   0.,   0.],
       [1.,   1.,   1.,   ...,   0.,   0.,   0.],
       [1.,   1.,   1.,   ...,   0.,   0.,   0.],
       ...,
       [0.,   0.,   0.,   ...,   1.,   0.,   0.],
       [0.,   0.,   0.,   ...,   1.,   0.,   0.],
       [1.,   1.,   1.,   ...,   0.,   0.,   0.],
```

FIG. 9

| variable_id | DryingDryingBasement1Mill051071MillNBleachStockPumpMIB_median | ... |
|---|---|---|
| 1.0 | 0.0 | ... |
| 2.0 | 3.0 | ... |
| 3.0 | 0.0 | ... |
| 4.0 | 3.0 | ... |
| 5.0 | 0.0 | ... |

| report_date_key | facility_name | tag_name | rolling | rank | Modified_DateTime |
|---|---|---|---|---|---|
| 20190618 | WAUNA MILL | WaunaRecaustMudFilter4210120MudFilterAgitatorOBMotorX | 0.107917619 | 1 | |
| 20190618 | WAUNA MILL | WaunaKraftWashers42307042NDSTGREPULPGBOBX | 0.135127804 | 2 | |
| 20190618 | WAUNA MILL | WaunaKraftWashers42306041STStageCHIPWasherREPULPERConveyorGBShaft2GBIBX | 0.109919212 | 3 | |
| 20190618 | WAUNA MILL | WaunaKraftWashers42306011STStageCHIPBRNSTKWasherMIBX | 0.182107164 | 4 | |
| 20190618 | WAUNA MILL | WaunaKraftWashers4230221EOPWasherDRIVEMOBX | 0.137034219 | 5 | |
| 20190618 | WAUNA MILL | WaunaKraft1stFloor4320242EOPSTGTOWERDilutionPumpPOBX | 0.232155009 | 6 | |
| 20190618 | WAUNA MILL | WaunaKraft1stFloor4320242EOPSTGTOWERDilutionPumpPOBY | 0.304229876 | 7 | |
| 20190618 | WAUNA MILL | WaunaKraft1stFloor4320142D0TOWERDilutionPumpMIBY | 0.125725505 | 8 | |
| 20190618 | WAUNA MILL | WaunaKraftWashers4320098021BLEACHDECKERWasherMIBX | 0.112541164 | 9 | |
| 20190618 | WAUNA MILL | WaunaUtilitiesReceovery4261188RecoveryBoilerDissolvingTankScrubberFanMIBY | 0.109862148 | 10 | |
| 20190618 | WAUNA MILL | WaunaKraftWashers4320098021BLEACHDECKERWasherMOBY | 0.108779532 | 11 | |
| 20190618 | WAUNA MILL | WaunaKraftWashers42505041STStageWasherRepulperGBOBY | 0.112749673 | 12 | |
| 20190618 | WAUNA MILL | WaunaKraftWashers42307042NDSTGREPULPGBOBY | 0.115997695 | 13 | |
| 20190618 | WAUNA MILL | WaunaKraftWashers4320225EOPWasherConveyorMIBX | 0.156499038 | 14 | |
| 20190618 | WAUNA MILL | WaunaKraftWashers42307042NDSTGREPULPGBIBY | 0.145121847 | 15 | |
| 20190618 | WAUNA MILL | WaunaKraft4thFloor4250104ESCOHYDRAULICSMOBY | 0.268561332 | 16 | |
| 20190618 | WAUNA MILL | WaunaKraftWashers42307042NDSTGREPULPGBIBX | 0.151366916 | 17 | |
| 20190618 | WAUNA MILL | WaunaKraftWashers42306011STStageCHIPBRNSTKWasherMOBX | 0.172354038 | 18 | |
| 20190618 | WAUNA MILL | WaunaKraftWashers4320098021BLEACHDECKERWasherMOBX | 0.104675138 | 19 | |
| 20190618 | WAUNA MILL | WaunaKraft1stFloor4320242EOPSTGTOWERDilutionPumpMIBX | 0.200742731 | 20 | |
| 20190618 | WAUNA MILL | WaunaKraftWashers4231011ACCEPTREWASHGBOBY | 0.480459235 | 21 | |
| 20190618 | WAUNA MILL | WaunaKraftWashers4320225EOPWasherConveyorGBOBX | 0.120568948 | 22 | |
| 20190618 | WAUNA MILL | WaunaKraft3rdFloor423140STHICKSTOCKPumpGBIBX | 0.27418561 | 23 | |
| 20190618 | WAUNA MILL | WaunaRecaustMudFilter4210120MudFilterAgitatorIBMotorX | 0.168533816 | 24 | |
| 20190618 | WAUNA MILL | WaunaKraftWashers42505041STStageWasherRepulperGBIBY | 0.140140423 | 25 | |

SYSTEMS AND METHODS FOR ANALYZING MACHINE PERFORMANCE

CROSS REFERENCE

The present Application for Patent claims the benefit of U.S. Provisional Patent Application No. 62/899,181 by Coyne and Shah, entitled "SYSTEMS AND METHODS FOR ANALYZING MACHINE PERFORMANCE," filed Sep. 12, 2019, assigned to the assignee hereof and expressly incorporated by reference in its entirety.

TECHNICAL FIELD

The present disclosure relates generally to systems and methods for analyzing performance of industrial equipment and, more particularly, to systems and methods for analyzing vibration data and for identifying and tracking vibration anomalies in industrial machines.

DESCRIPTION OF THE RELATED TECHNOLOGY

It is generally understood and accepted that anomalous (e.g., excessive) machine vibration can be indicative of sub-optimal machine performance and impending machine breakage. Noting this, many industrial machines include sensors that measure vibration and other physical phenomena, and previous approaches for assessing machine vibration may rely on monitoring signals received from the sensors. All industrial machines produce some level of vibration during operation; therefore, it may be desirable to detect when vibration metrics are in an anomalous state. Previous solutions include systems for detecting when a sensor reports a vibration metric that satisfies or exceeds a given threshold. However, a given industrial machine may include hundreds of sensors and a facility may include hundreds (or more) of industrial machines. Consequently, these systems are incapable of simultaneously analyzing vibration data from the vast multitude of sensors in a facility. At industrial scale, previous systems are also incapable of identifying and tracking vibration anomalies and, thus, cannot report all industrial machines in a facility that are deviating from optimal performance.

Furthermore, because vibration sensors are subject to a variety of factors that may compromise data integrity, a suitable solution for normalizing vibration data collected from sensors may be desirable. For example, previous solutions may not properly control for noise, time series discrepancies, breakage events, and other factors that influence data analyses. Accordingly, the inability to control such factors may render analyses infeasible or inaccurate. In particular, the inability to adequately process vibration data to control for variations may add significant complexity to performing industrial scale assessments of machines in a facility (e.g., because comparisons between given data points may be rendered useless by uncontrolled disparities between the given data points).

Thus, a system or method may be beneficial that can: analyze vibration data from one or more sensors of one or more industrial machines in a facility; identify and track vibration anomalies simultaneously for one or more industrial machines in a facility; and report industrial machines in a facility that may be deviating from optimal performance.

SUMMARY

Briefly described, and according to one embodiment, aspects of the present disclosure generally relate to systems and methods for monitoring vibration and identifying and tracking vibration anomalies within one or more (e.g., up to all) industrial machines in a facility (or, alternatively, multiple facilities).

In various embodiments, the system described herein collects, transforms, and analyzes sensor data from one or more machines, such as industrial machines. In one or more embodiments, the system identifies one or more sensors (of one or more industrial machines) that are experiencing vibrational anomalies. In some embodiments, a vibrational anomaly may refer to a substantial or distinguishable increase or decrease in one or more vibration metrics collected from a sensor on an industrial machine. In at least one embodiment, the system: collects and analyzes vibration data for a set of one or more vibration-related sensors of one or more industrial machines of a facility (e.g., from a single one up to all available sensors of up to all of the industrial machines of the facility); determines (or identifies) an occurrence of one or more anomalies based on the vibration data; tracks anomalies in collected vibration data for the one or more industrial machines of the facility; generates a report of vibration data for the one or more vibration-related sensors of the facility; and reports industrial machines in the facility that may deviate from a target performance (e.g., according to a deviation indicated by associated vibrational data).

In various embodiments, the system described herein includes one or more vibration-related sensors that are operatively connected to the system in a manner such that sensor readings may be readily communicated to the system. In one or more embodiments, the one or more vibration-related sensors of a given facility may be connected to the present system. In at least one embodiment, the system, using a plurality of identifiers, may associate each of the one or more vibration-related sensors with one or more of: a specific sensor type, a specific machine, and a specific facility.

FIG. 1 shows an example flowchart illustrating a process that supports analyzing machine performance in accordance with aspects of the present disclosure. In various embodiments, the system collects vibrational data from one or more sensors of a particular facility (e.g., as is shown with respect to FIG. 1 at step 102). In at least one embodiment, vibrational data includes, but is not limited to, one or more of: sensor readings such as specific numerical measurements obtained via one or more sensors, indications that an instantaneous or aggregate value exceeds or does not exceed a threshold, relational or comparative readings between different measurements at different times and/or from different sensors, and any other information that may be obtained from one or more sensors. In one or more embodiments, the system may collect vibrational data continuously or may do so at discrete intervals (e.g., regular intervals, intervals at times given by a predefined or configured periodicity or equation, etc.). In at least one embodiment, the system collects vibrational data automatically (e.g., autonomously) and/or in response to receipt of a command (e.g., from a system user, facility operator, based on determining that one or more criteria have been satisfied, etc.). In various embodiments, the system may collect vibrational data from a data historian (e.g., at a server connected via a communications network), or the like, that receives (e.g., continuously or at various intervals) vibrational data from one or more sensors of a facility and stores vibrational data from the one or more sensors of the facility. In one embodiment, the data may include information based on one or more of a plurality of categories including, but not limited to: one or more facility identifier (e.g., "dim_facility_key" as is shown herein, such as with respect to FIG. 4); one or more times (e.g., an instantaneous time indicated as a numerical value and/or an interval of time values formatted as a range of integers, such as a value from 0-23); one or more indicator types (e.g., peak velocity, overall acceleration, etc.); one or more sensor names; one or more voltage values; one or more temperature values; one or more peak velocity values; one or more peak acceleration values; one or more overall root mean square (RMS) values; one or more overall vibration values, and other similar values.

In one or more embodiments, sensor data may be organized by sensor type (e.g., according to an indicator type category), the system described herein may analyze a variety of metrics individually and/or in one or more combinations. For illustrative purposes, some embodiments of the system address overall vibration, peak acceleration and overall RMS metrics; however, analyses utilizing other metrics (e.g., using temperature, voltage, and/or peak velocity, among other like metrics) are possible according to aspects of the present disclosure.

In one or more embodiments, the system organizes collected vibrational data into at least one file (e.g., as is shown with respect to FIG. 1 at step 102 and FIG. 4). In various embodiments, at least one file may be of a column-oriented data storage format. For example, at least one file may be a parquet file that stores nested data structures in a flat columnar format. In one or more embodiments, the vibrational data may include time stamps, or the like, that indicate a time when the data (and entries thereof) were measured. For example, the system may include (e.g., in the parquet file) the sensor data within a given data range by providing, for each sensor, a time series of data points (e.g., a sequence of time data points including vibrational data, which may be from one or more the above described categories) associated with a concatenation of a sensor's metadata text. Thus, in at least one embodiment, at least one file may be columnar-oriented and include vibrational data from any and/or all sensors of a facility.

In various embodiments, a concatenation of a sensor's metadata may include one or more parent keys that each provide a unique identifier for rows of an array (e.g., a data frame, matrix, etc.). In one or more embodiments, the system may process the concatenation and the one or more parent keys thereof to create sensor-identifying and/or sensor-describing columns in the array. For example, as is shown with respect to FIG. 2, a concatenation may be organized as a concatenation of eight keys, for example: parent_key1+parent_key2+parent_key3+parent_key4+parent_key5+parent_key6+parent_key7+parent_key8, where each parent key may be established as a column of an array and each entry of each column may include identifying information and/or descriptive information regarding a sensor (e.g., based on a reading obtained from the sensor). In at least one embodiment, the one or more parent keys each describe and/or classify an aspect of a sensor. In one or more embodiments, a parent key may provide information regarding a location of a sensor, one or more sensor functions and other related sensor details. Thus, in at least one embodiment, the concatenation may contain one or more parent keys that, individually and/or in combination, provide descriptions and/or classifications of a sensor.

In various embodiments, the system described herein performs one or more data cleaning and/or data organization processes to place the time series of data points into a particular format. In at least one embodiment, the system standardizes (or, e.g., normalizes) the time series of data points to conform to a particular time interval. According to the techniques described herein, the system may analyze and/or perform operations on vibrational data using any time interval basis. Accordingly, embodiments provided herein are for illustrative and descriptive purposes, and embodiments utilizing alternate time interval schema at any step described herein are contemplated. For example, the system may average a sequence of 55 data points collected in a one-hour time interval and replace the sequence of data points with a single value according to the average of the sequence. Because one or more sensors may collect readings at disparate intervals, the system performs the above standardization operations to establish a global time basis for the time series of data points. Thus, the system may create a data landscape where comparisons between time series data (e.g., of originally disparate time intervals) may be performed readily and with minimized complexity.

In one or more embodiments, the system described herein builds a data model by reading vibrational data of at least one columnar storage file (e.g., a parquet file) into one or more data frames (e.g., as shown with respect to FIG. 3). In at least one embodiment, the system may automatically sort and sequence the vibrational data, for example, by day and hour in ascending order or descending order. In one or more embodiments, the system may sort and sequence vibrational data by any time interval and in any order. In various embodiments, before performing analytical activities, the system may determine and record one or more (e.g., a proportion) of missing values for each column of the data frame (e.g., as is shown with respect to FIG. 1 at step 104). In one or more embodiments, the system generates and transmits (e.g., to a facility operator) a missing values report that describes one or more missing values (e.g., via a proportion) for each column of the one or more data frames (e.g., as is shown with respect to FIG. 1 at step 106).

In various embodiments, for example, as is shown with respect to FIG. 1 at step 108, the system segregates data (e.g., from a data frame) and defines a matrix for each category in a set of categories including, but not limited to, one or more of: peak acceleration, overall RMS and overall vibration. In one embodiment, each matrix (e.g., as is shown with respect to FIG. 6) includes vibrational data (e.g., as indicated in the data frame) that is associated with the corresponding category. In various embodiments, for example, as is shown with respect to FIG. 1 at step 110, the system performs a completeness filtering process on each defined matrix by defining a completeness threshold that refers to a proportion of actual, obtained values (e.g., not missing values) in a column of the data frame. According to the techniques described herein, each column of a matrix may represent a single sensor; thus, if a column is removed from the data frame, the removal constitutes removal of a sensor from analysis (e.g., though the removed sensor may be reported by the system). In various embodiments, the system calculates, for each column of a matrix, a completeness percentage based on the recorded proportion of missing values—that is, a proportion of measured values relative to total values. In one or more embodiments, the system removes a column that has a completeness percentage that does not satisfy (e.g., meet or exceed) a respective completeness threshold. Thus, the system may identify which columns contain an insufficient proportion of obtained (e.g., not missing) data and remove the identified columns.

In various embodiments, for example, as is shown with respect to FIG. 1 at step 112, the system performs missing data imputation to replace one or more missing values with real data values (e.g., in columns that were retained following completeness filtering). In at least one embodiment, the system adds, to each of the matrices, an additional column that assigns a sequential identifier to each row of data. Thus, the system may sequentially number each row of a matrix via a sequential numbering column. In at least one embodiment, each column in a matrix (aside from a sequential numbering column) may represent a sensor and each row in a matrix may represent a value of the sensor at a predetermined observation interval (e.g., the rows may represent hourly observations).

In various embodiments, for example, as is shown with respect to FIG. 1 at step 114, the system calculates an average (e.g., a mean or median value) for one or more sets of data points in each column of each matrix, where each set may include one or more respective data points. In at least one embodiment, the length of each of the one or more sets of data points may be determined automatically (e.g., autonomously) and/or manually (e.g., a length parameter may be determined in response to a received input). For example, the system may replace every set of 24 data points in each column of each matrix with a replacement value, such as a median value of the set of data points. Thus, in this example, the length of each set of the one or more sets of points is 24. In at least one embodiment, the system replaces each set of the one or more sets of data points with a corresponding computed median. Continuing with this example, the system may replace every 24 hours-worth of data with a median value of that data. In various embodiments, for example, as is shown with respect to FIG. 1 at step 116, the system computes a difference between each sequential median of each column, that is, a difference between a first column and a second column adjacent to the first column. In at least one embodiment, if a computed difference is greater than 0 (e.g., indicating that the subsequent set of data has a greater median than the previous set of data), the system replaces the preceding value with a 1 and, otherwise, replaces the preceding value with a 0. By this method, in at least one embodiment, the system replaces up to each of the values in a matrix with either a 1 or a 0, where a 1 may represent a vibration "penalty" (i.e., an increasing measure of vibration) and a 0 may represent decreasing or constant vibration.

In various embodiments, for example, as is shown with respect to FIG. 1 at step 118, the system sums the matrices to generate a combined penalty matrix (e.g., where values of corresponding indices of each matrix are summed). In this way, the combined penalty may represent, for example, an aggregated representation of "penalties" (i.e., indicators of increasing vibration) for a particular set of sensors, such as of a particular sensor type, a particular machine, or a particular facility.

In various embodiments, for example, as is shown with respect to FIG. 1 at step 120, the system generates, from the combined matrix, a rolling mean for a particular time interval and appends the mean to the matrix (e.g., the system adds a column, to the first fifteen rows of the matrix, whose entries are the rolling mean). For example, the system may generate a seven-day rolling mean and append the mean to the matrix. In some embodiments, a particular time interval may be any interval of time (e.g., 7 days, 3 months, 12 hours, etc.). In various embodiments, for example, as is shown with respect to FIG. 1 at step 122, the system removes rows (e.g., thereby filtering sensors) from the combined matrix that present an average (e.g., a seven-day rolling mean) that is less than a performance threshold (e.g., a predetermined value). Accordingly, the remaining sensors may be considered to be the sensors that have recorded anomalous vibration. In various embodiments, for example, as is shown with respect to FIG. 1 at step 124, the system generates and transmits (e.g., to a facility operator, database, etc.) a master spreadsheet by performing a union of each combined matrix (each combined matrix representing, e.g., a particular industrial machine in a facility, a particular sensor type within a facility, or generally a number of sensors within a facility, etc.). Accordingly, the system may present a facility manager, or the like, with an output, such as a spreadsheet, documenting one or more sensors (e.g., of one or more industrial machines) in a particular facility that are recording anomalous vibration.

In various embodiments, the system organizes the master spreadsheet by ranking sensors therein in order of descending vibrational anomaly. In at least one embodiment, the system may perform ranking by sorting (e.g., in a combined penalty matrix or in the master spreadsheet) sensors by sum penalty (in descending order). In at least one embodiment, penalty ranking of sensors (e.g., numerous sensors up to and including all assets in a facility) may allow for rapid identification (e.g., by a facility operator) of potential performance issues occurring in one or more assets.

As is understood by a person having ordinary skill in the art, the steps and process shown with respect to FIG. 1 (and those of all other flowcharts and sequence diagrams shown and described herein) may operate concurrently and continuously, are generally asynchronous and independent, and are not necessarily performed in the order shown. Reference has been made herein to one or more Figures; however, such references are included for illustrative purposes and do not place any limitations on any methods, systems and processes described herein.

These and other aspects, features, and benefits of the claimed invention(s) are apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

FIG. 2 shows an example dataset that supports analyzing machine performance in accordance with aspects of the present disclosure.

FIG. 5 shows an example matrix that supports analyzing machine performance in accordance with aspects of the present disclosure.

FIG. 6 shows example segregated matrices that support analyzing machine performance in accordance with aspects of the present disclosure.

FIG. 9 shows a diagram illustrating an example process for generating a penalty matrix that supports analyzing machine performance in accordance with aspects of the present disclosure.

FIG. 12 shows an example master spreadsheet that supports analyzing machine performance in accordance with aspects of the present disclosure.

DETAILED DESCRIPTION

Figure 1:
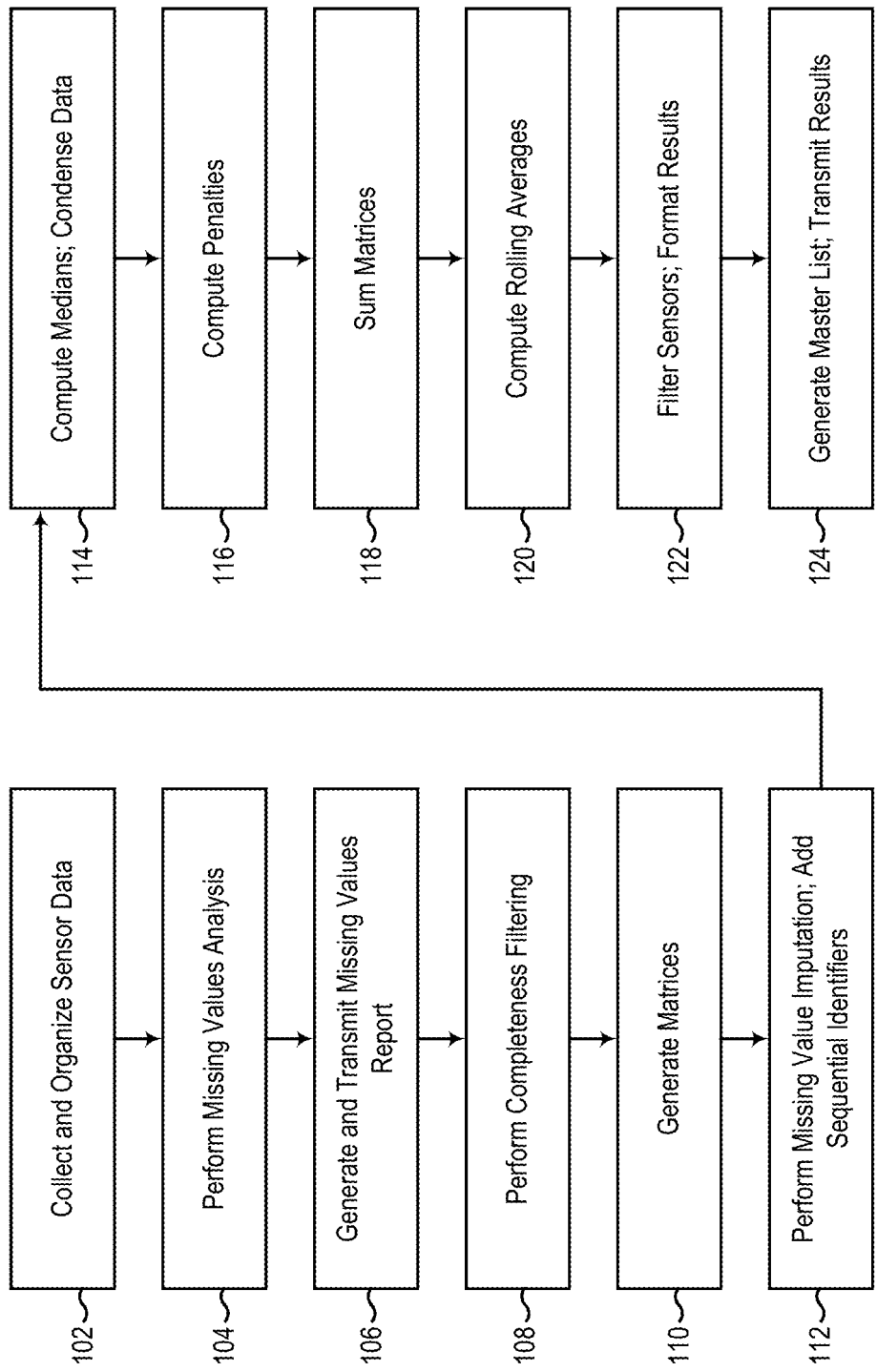
FIG. 1 shows an example flowchart illustrating a process that supports analyzing machine performance in accordance with aspects of the present disclosure.

To promote an understanding of the principles of the present disclosure, reference is made to the embodiments illustrated in the drawings and specific language is used to describe the same. Nevertheless, it is understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

In various embodiments, the present system collects, transforms, and analyzes sensor data from one or more machines, for example, one or more industrial machines in an industrial facility, such as manufacturing machines, production machines, and other like industrial equipment. In one or more embodiments, the system identifies one or more sensors that are experiencing vibrational anomalies (e.g., sensors of one or more of the machines, such as displacement sensors, velocity or speed sensors, accelerometers, and other like measurement devices). In some embodiments, a vibrational anomaly refers to a substantial or distinguishable increase in one or more vibration metrics collected from a sensor on an industrial machine. In at least one embodiment, the system: collects and analyzes vibration data for one or more vibration-related sensors of one or more industrial machines of a facility; identifies and tracks anomalies in collected vibration data for the one or more industrial machines of a facility; generates a report of vibration data for the one or more vibration-related sensors of a facility; and reports one or more industrial machines in a facility that may be deviating from optimal performance (e.g., as indicated by associated vibrational data).

In various embodiments, the present system includes one or more vibration-related sensors that are operatively connected to the system in a manner such that sensor readings may be readily communicated to the system. In one or more embodiments, one or more vibration-related sensors of a given facility may be connected to the present system. In at least one embodiment, the system, using a plurality of identifiers, may associate each sensor with one or more of: a specific sensor type; a specific machine; and a specific facility.

In various embodiments, the system collects vibrational data (e.g., sensor measurements, readings, etc.) from one or more sensors of a particular facility. In one or more embodiments, the system may collect vibrational data continuously or may do so at regular, pre-defined intervals. In at least one embodiment, the system collects vibrational data automatically and/or in response to receipt of a command (e.g., from a system user, operator, etc.). In various embodiments, the system may collect vibrational data from a data historian, or the like, that continuously receives and stores vibrational data from one or more sensors of a facility.

In one or more embodiments, the system utilizes a distributed cluster computing framework (e.g., such as Apache Spark) to create a resilient distributed dataset (e.g., by applying a PySpark function that pivots collected and stored vibrational data). In at least one embodiment, a resilient distributed dataset ("RDD") may be preferably utilized over more traditional datasets, such as datasets generated via relational database management systems ("RDBMS"), because RDDs may be better-suited to facilitate data transformation and extraction processes, as may be used for some aspects of the techniques described herein. For example, the system, after collecting sensor data for one or more sensors in a facility, may transpose a row-oriented dataset into a column-oriented RDD (e.g., as is shown with respect to FIGS. 3 and 8) by executing a function. In at least one embodiment, the function is a PySpark function that leverages both an open-source cluster-computing framework (e.g., Apache Spark) and Python, a general-purpose, high-level programming language. In some embodiments, the PySpark function is utilized over other methods (e.g., SQL query and traditional relational database management system ("RDBMS") tools), because the function permits concatenation of an entire parent key hierarchy and may avoid memory errors encountered in other functions (e.g., that may be caused by excessive character counts, etc.). In at least one embodiment, the distributed framework and database permits the system to collect and manipulate data from a wide range of vibrational sensors installed in a multitude of industrial machines across a plurality of facilities. Because the system collects and acts upon data from a diverse set of sources, a distributed framework and database may allow for a more efficient and comprehensive analysis of machine operation. In at least one embodiment, use of the distributed framework and database allow the system to rapidly make comparisons across a plurality of sensors, machines and facilities. For example, the system may leverage the distributed architecture to compare the performance of machines between two or more different facilities to better inform operators thereof regarding expected maintenance workloads.

In various embodiments, one or more vibrational sensors (each sensor being associated with a particular industrial machine), such as displacement sensors, velocity or speed sensors, accelerometers, and other like measurement devices, may be operatively connected to the system in a manner such that the system can retrieve data from each vibrational sensor. To initiate a vibrational analysis, in at least one embodiment, the system collects vibrational data that may have been obtained from one or more sensors of one or more assets in a facility over a specified time period. For example, the system may aggregate readings from vibrational sensors mounted on or near one or more industrial machines from the vibrational sensors themselves and/or from a data historian (e.g., from a server with stored information) over a period such as two weeks (although any other longer and shorter time spans are also contemplated herein).

FIG. 2 shows an example dataset 200 that supports analyzing machine performance in accordance with aspects of the present disclosure. As is shown with respect to FIG. 2, the system then creates a first dataset 200.

Figure 3:
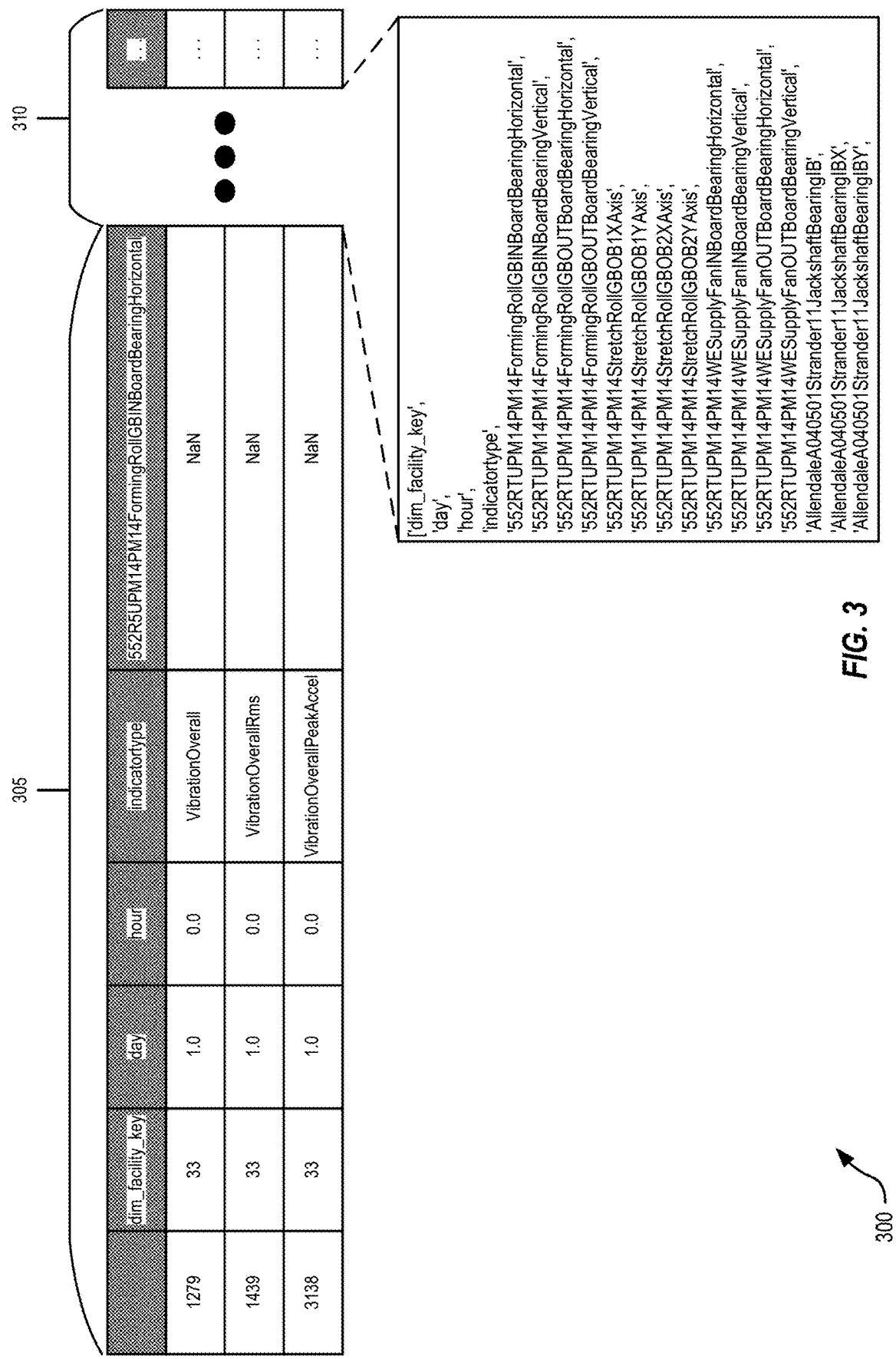
FIG. 3 shows an example dataset that supports analyzing machine performance in accordance with aspects of the present disclosure.

FIG. 3 shows an example dataset 300 that supports analyzing machine performance in accordance with aspects of the present disclosure. As is shown with respect to FIG. 3, the system may then execute a command (e.g., a PySpark job) to produce a second dataset 300 (e.g., as is also shown with respect to FIG. 4) that includes the retrieved data and leverages concatenations of metadata text (from the plurality of sensors) for data organization (via columns). In the example of FIG. 3, the data set may include any number of rows and columns, each representing different sets of corresponding measurements (e.g., 3 rows by 17,145 columns, or any other greater or smaller amounts of rows and columns).

Returning to FIG. 2, in various embodiments, a concatenation of a sensor's metadata may include one or more parent keys that each describe and/or classify an aspect of a sensor. For example, as is shown with respect to FIG. 2, a concatenation 205 may be organized as: parent_key1+parent_key2+parent_key3+parent_key4+parent_key5+parent_key6+parent_key7+parent_key8. In various embodiments, a parent key may provide information associated with a sensor including, but not limited to: a facility where a sensor is located; an asset (e.g., an industrial machine) where a sensor is installed; a portion of an asset where a sensor is installed; a string indicating a direction with respect to which a sensor collects readings; and other sensor, asset and/or facility details. For example, FIG. 2 shows parent keys that indicate: a location of the facility in which the sensor is located (parent_key1), an asset (parent_key2), a portion of an asset or a location on the asset (e.g., parent_key3), and/or a direction or orientation of the sensor (e.g., parent_key4 and parent_key5). Accordingly, in at least one embodiment, the concatenation 205 may contain one or more parent keys that provide descriptions and/or classifications of a sensor.

Referring again to FIG. 3, in one or more embodiments, the second dataset 300 may include time series values for a plurality of attributes including, but not limited to: overall vibration (e.g., "VibrationOverall," as shown in the dataset 300), overall RMS (e.g., "VibrationOverallRms," as shown in the dataset 300), and peak acceleration (e.g., "VibrationOverallPeakAccel," as shown in the dataset 300), as are shown in FIG. 3, as well as additional values such as peak velocity, temperature, and/or voltage. Here, overall vibration may refer to a direct vibration measurement or a calculated parameter according to one or more measurements (e.g., measured as a speed, such as in inches per second (in/s)); overall RMS may refer to the RMS of a corresponding vibration measurement; peak acceleration may refer to a local maximum of an acceleration curve caused by the vibration; peak velocity may refer to a local maximum of a velocity curve caused by the vibration; temperature may refer to an instantaneous temperature measurement; and voltage may refer to an instantaneous voltage measurement.

Figure 4:
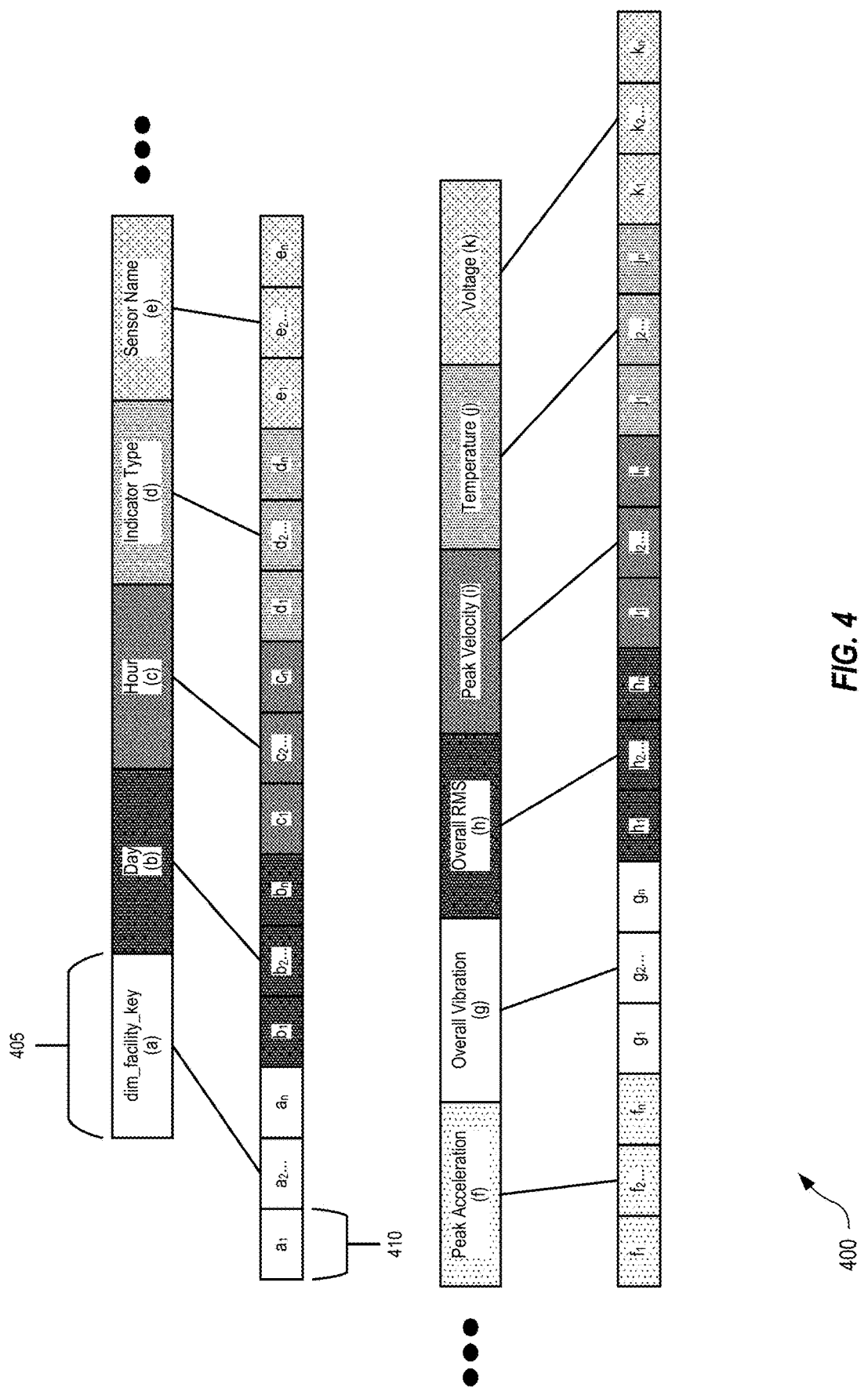
FIG. 4 shows a diagram illustrating an example data organization schema that supports analyzing machine performance in accordance with aspects of the present disclosure.

In at least one embodiment, the second dataset 300 includes (for each sensor) columns that are each associated with a metadata category. In one or more embodiments, as shown in the first group of columns 305 of FIG. 3, metadata categories include, but are not limited to: a facility identifier (e.g., "dim_facility_key," as shown in FIG. 3 and as also shown in FIG. 4); a day parameter (e.g., "day" as shown in FIG. 3, which may be formatted as an integer, such as from 0 counting up); a time parameter (e.g., "hour" as shown in FIG. 3, formatted as a range of integers, such as 0-23); and/or an indicator type parameter (e.g., "indicatortype" as shown in FIG. 3, which may have a value such as peak velocity, overall acceleration, etc.). Also shown in FIG. 3 are numerous additional metadata columns in a second group of columns 310 (e.g., some embodiments, e.g., may include 17,145 or more columns), with metadata categories that may include, but are not limited to a sensor name (e.g., which may itself be a concatenation of multiple parent keys as described herein), and any other similar values. In some embodiments, the system may collect and organize data associated with one or more specific attributes and, in some cases, may not collect and organize data associated with one or more other specific attributes. For example, the system may collect and organize data associated with overall vibration measurements and peak acceleration measurements, while not collecting and organizing data associated with overall RMS measurements, for example. In at least one embodiment, the system may receive a command (or, instruction) from a facility operator and/or from a server connected to the system (e.g., an instruction to enable or disable data collection for a particular parameter), and the system may execute the command accordingly—that is, enabling or disabling collection and organization of data as instructed by the command.

In various embodiments, the second dataset 300 may organize sensors with or without respect to specific facility assets (e.g., industrial machines). Thus, in at least one embodiment, the second dataset 300 (and any dataset, data frame, matrix, etc.) may be organized by and/or include a facility key and an indicator type, and may organize sensor data irrespective of a specific associated asset. In some embodiments, a facility key may refer to an identifier (for example, a character sequence) that associates a data point, sensor, etc. with a particular facility (e.g., from which the data point, sensor, etc. was sourced). Thus, a facility key may uniquely identify a particular facility. In one or more embodiments, any data collected from a particular facility may include a facility key that identifies and associates the collected data with the particular facility. In at least one embodiment, one or more second datasets 300 may be organized (e.g., in a distributed storage environment) by a plurality of facility keys, each of the one or more second datasets being associated with one of the plurality of facility keys. In one or more embodiments, organization of sensor data by facility and sensor type may permit more focused (e.g., sensor-specific) analyses than those achieved in previous solutions that do not focus on individual sensors, but analyze general asset performance. Accordingly, sensors associated with the same asset may occur in any order and any location in the second dataset 300.

In various embodiments, to account for irregular time series data, the system processes collected data. In some embodiments, irregularities in time series data may be caused by machine downtime, malfunctioning sensors, environmental damage physical contact (e.g., by human personnel), and other like events. Furthermore, time series data for each of the plurality of attributes may be sourced from readings that occurred at different intervals. For example, peak velocity data may have been collected at intervals of 10 minutes, whereas overall RMS may have been collected at intervals of 30 minutes. In one or more embodiments, to account for contrasting intervals and standardize the returned data, the system averages (e.g., obtains a median value) the values on an hourly basis. In the same example, the system would obtain a median of 6 readings per hour of the peak velocity data to obtain an hourly peak velocity average, and would obtain a median of 2 readings per hour of the RMS readings to obtain an hourly RMS average. Thus, for a day's worth of data, the system may produce 24 median data values for each attribute. In this manner, data for each attribute may present a common time reference. In various embodiments, it is contemplated that the frequency (and correspondingly the respective intervals) for measurements and for average calculations may be greater or smaller than described herein, for example, measurements and average calculations may be performed every 30 minutes (or more frequently), every 2 hours (or less frequently), or at any other frequency. In one or more embodiments, the system stores averaged data values in one or more columnar storage files (e.g., parquet files), which may themselves be placed in object-based storage (e.g., such as Amazon Web Services' S3 Amazon Simple Storage Service). In at least one embodiment, each of the one or more columnar storage files may include up to all returned, averaged sensor data for a particular facility.

FIG. 4 shows a diagram illustrating an example data organization schema 400 that supports analyzing machine performance in accordance with aspects of the present disclosure. The example organization schema 400 shows nine data frames 405, where each data frame 405 may include one or more data entries 410. The example organization schema 400 of FIG. 4 is illustratively shown as including nine data frames for nine respective categories of information, but it is contemplated that the organization schema 400 may include any number of data frames 405 (e.g., greater or fewer than the nine shown in FIG. 4). Likewise, the example organization schema 400 of FIG. 4 is illustratively shown as including three data entries 410 per data frame, these three data entries 410 having respective indices of "1," "2, . . . " and "n." This signifies that although three data entries 410 are shown for each data frame 405 in this example, each data frame 405 may include any number from 1 to n data entries 410.

In various embodiments, the system constructs a data model leveraging a plurality of code libraries that contain executable code capable of performing functions including, but not limited to: processing tabular data, facilitating matrix-based operations (e.g., matrix transformations, etc.), reading data from object-based storage, importing execution roles (e.g., permissions), analyzing time series data, facilitating date and/or time conversions, importing text transformation functions (e.g., such as StringIO), and performing mathematical expressions. In one or more embodiments, the system reads data from each of the one or more columnar storage files (e.g., parquet files) and stores each of the data entries 410 included in the read data (e.g., for each facility) in at least one data frame 405. Thus, averaged sensor data for each facility may be read into and stored within at least one corresponding data frame 405 (e.g., as is shown with respect to FIG. 4). In at least one embodiment, the system may leverage a distributed service (e.g., such as Amazon Web Service SageMaker) to produce the data frames 405.

In various embodiments, the system performs one or more data cleansing operations. In one embodiment, for each data frame 405 (e.g., in some embodiments, representing each facility) the system sorts the data therein by both day and hour in ascending order. Thus, sensor data for each attribute (e.g., peak acceleration, overall vibration, overall RMS, etc.) of each data frame 405 may be sorted by day and hour in ascending order.

FIG. 5 shows an example matrix 500 that supports analyzing machine performance in accordance with aspects of the present disclosure. In one or more embodiments, the system generates a missing values report for each data frame. In at least one embodiment, the system, for each attribute of each data frame, calculates a completeness percentage based on the magnitude of one or more missing values 505 therein. In various embodiments, a "missing value" 505 may refer to: an index of the matrix 500, or the like, that contains a null or Not a Number ("NaN") value; an index of the matrix 500 that contains a value that is at least one order of magnitude lower than values of other indices in a shared column of the matrix (e.g., as is shown by the example missing values 505 shown in FIG. 5); and/or an index of the matrix 500 containing no value. In at least one embodiment, the system may establish (e.g., automatically and/or in response to a received command) a programmatic definition of a "missing value" 505 that is used to determine if an index contains one or more missing values 505.

In various embodiments, the system outputs (e.g., on a display, in an electronic report, etc.) a data frame including each attribute (e.g., represented as a column) followed by a corresponding completeness percentage—that is, a percentage may be provided for each attribute. In at least one embodiment, the system automatically reports (e.g., to a system user, facility manager, etc.) attributes presenting a low completeness percentage. In some embodiments, the system automatically determines a "low" completeness percentage by comparing each completeness percentage to a threshold (e.g., a predefined threshold or a configurable threshold, e.g., based on a target accuracy, reliability, and/or performance).

For example, the system may compute a particular facility's temperature attribute completeness to be 50% and compare the percentage to a 70% completeness threshold. In the same example, the system may determine that the temperature completeness percentage is less than the threshold. Accordingly, the system may generate and deliver an electronic report to an associated facility manager (e.g., to investigate the source of the incompleteness). In various embodiments, an electronic report may include, but is not limited to: a facility identifier, an attribute identifier, an attribute column, a completeness percentage, and/or time and date information associated with data used to compute the completeness percentage, and the like. Thus, the system may produce one or more data frames (each data frame, e.g., associated with a particular facility) and may determine and report, from the one or more data frames, attributes that present an intolerably low completeness percentage.

FIG. 6 shows example segregated matrices 600 that support analyzing machine performance in accordance with aspects of the present disclosure. In various embodiments, the system segregates attributes of a data frame into one or more distinct matrices (e.g., as is shown with respect to FIGS. 6 and 7). As shown in the example of FIG. 6, the segregated matrices 600 may include a first segregated matrix 605 (e.g., a peak acceleration matrix), a second segregated matrix 610 (e.g., an overall velocity matrix), and a third segregated matrix 615 (e.g., an RMS matrix). The first segregated matrix 605 may include specific data entries including peak acceleration data; the second segregated matrix 610 may include specific data entries including overall velocity data; and the first segregated matrix 605 may include specific data entries including RMS data.

Thus, in at least one embodiment, the system defines a peak acceleration matrix 605, an overall vibration matrix 610, and an overall RMS matrix 615, where each matrix includes corresponding attribute data from the columns of the data frame. For example, the system may generate a peak acceleration matrix 605, an overall vibration matrix 610, and an overall RMS matrix 615 such that each matrix includes up to all associated data for each sensor (e.g., facility identifier, sensor name, day, hour, values, etc.) in the data frame.

Figure 7:
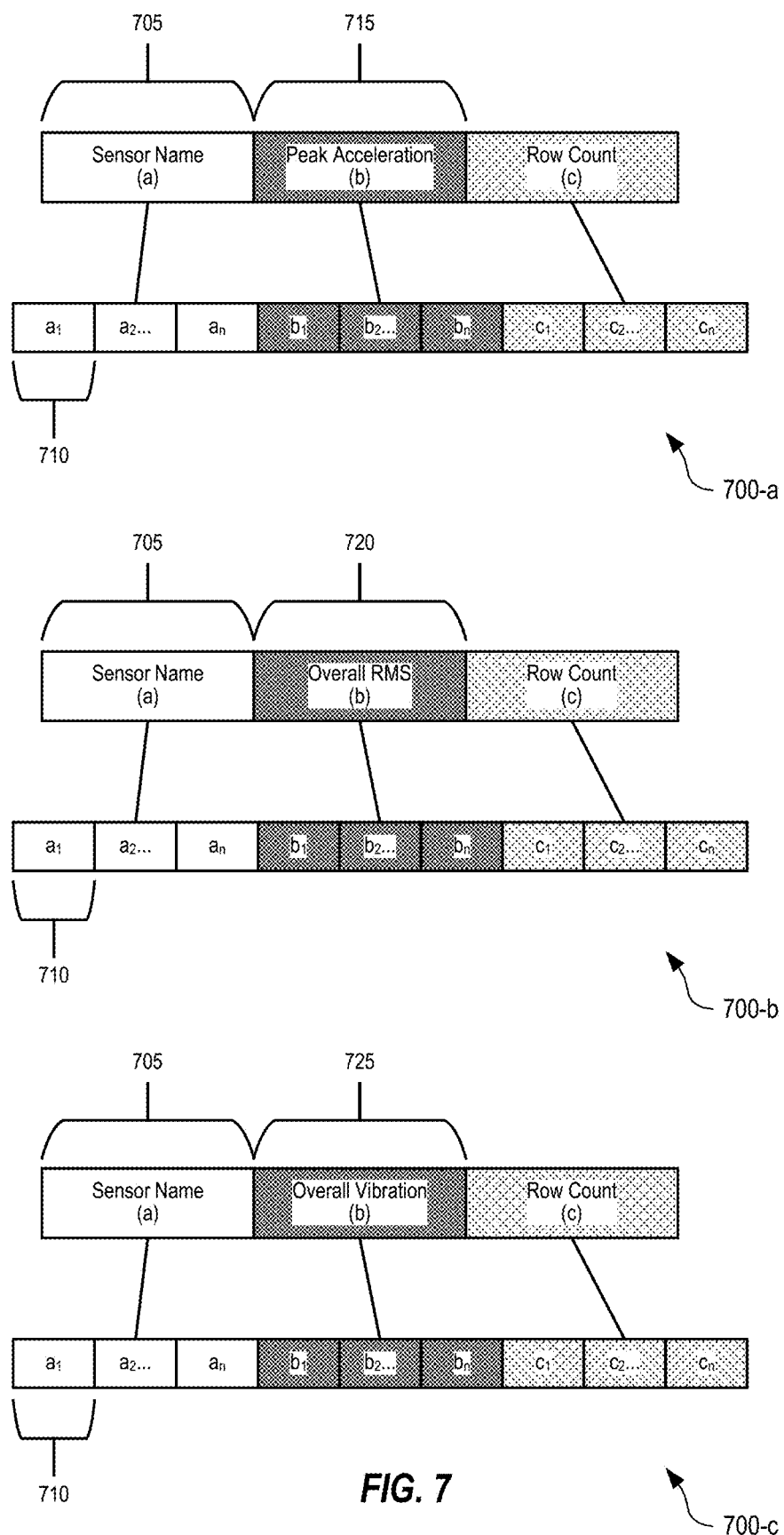
FIG. 7 shows a diagram illustrating example data organization schemas that support analyzing machine performance in accordance with aspects of the present disclosure.

FIG. 7 shows a diagram illustrating example data organization schemas 700 that support analyzing machine performance in accordance with aspects of the present disclosure. The data organization schemas 700 include a first data organization schema 700-a including peak acceleration data, a second data organization schema 700-b including overall RMS data, and a third data organization schema 700-c including overall vibration data.

Each of the example organization schemas 700 shows three data frames 705, where each data frame 705 may include one or more data entries 710. The example organization schemas 700 of FIG. 7 are illustratively shown as including three data frames for three respective categories of information, but it is contemplated that the organization schemas 700 may include any number of data frames 705 (e.g., greater or fewer than the three shown in FIG. 7). Likewise, the example organization schemas 700 of FIG. 7 are illustratively shown as including three data entries 710 per data frame, these three data entries 710 having respective indices of "1," "2, . . . " and "n." This signifies that although three data entries 710 are shown for each data frame 705 in this example, each data frame 705 may include any number from 1 to n data entries 710.

As similarly described with reference to FIG. 6, matrices may be segregated into distinct segregates matrices, for example, a peak acceleration matrix, an overall RMS matrix, and an overall vibration matrix, where each matrix includes corresponding attribute data from the columns of the data frame. Accordingly, this attribute data for each of the respective attributes may be stored in a respectively segregated data frame 705. For example, a data frame 715 as shown in the first schema 700-a may store the segregated peak acceleration data, a data frame 720 as shown in the second schema 700-b may store the segregated overall RMS data, and a data frame 725 as shown in the third schema 700-c may store the segregated overall vibration data.

Figure 8:
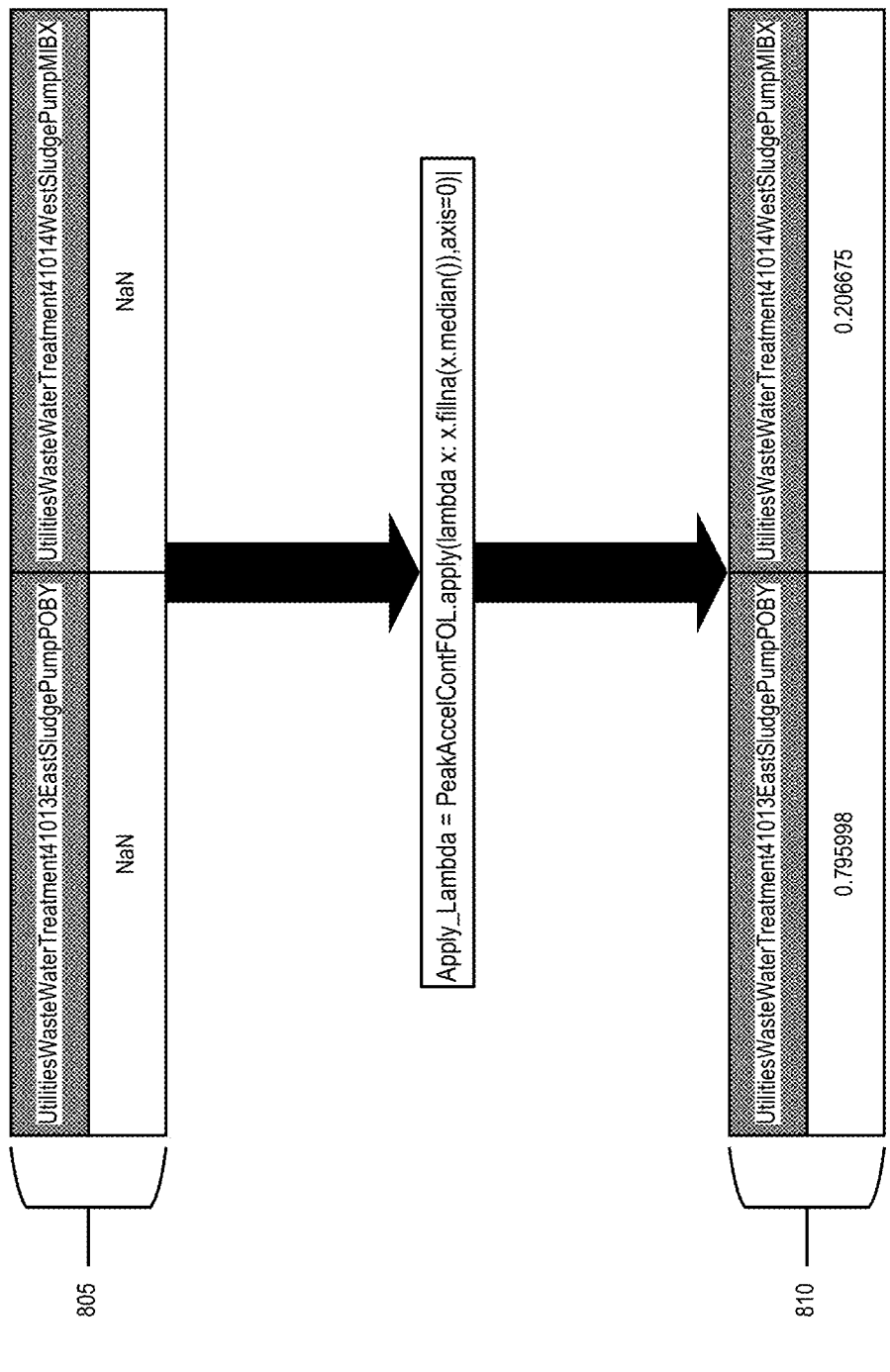
FIG. 8 shows a diagram illustrating an example data imputation process that supports analyzing machine performance in accordance with aspects of the present disclosure.

FIG. 8 shows a diagram illustrating an example data imputation process 800 that supports analyzing machine performance in accordance with aspects of the present disclosure. In one or more embodiments, the system performs completeness filtering and missing data imputation operations on each of the one or more distinct matrices (e.g., as is shown with respect to FIG. 8) for data of each of one or more attributes. In at least one embodiment, the system defines a filter threshold expressed as a percentage. In various embodiments, the filter threshold may be automatically or manually defined. In one or more embodiments, the system may collect an input from a user, the input defining the filter threshold.

In various embodiments, the system compares the filter threshold to the completeness percentage of each column of each attribute in the data frame. In one or more embodiments, the system removes columns which present a completeness percentage less than the filter threshold. For example, if the system defines a filter threshold of 60% and a column in the data frame presents a completeness percentage of 55%, the system removes the column from the data frame. Thus, the system may remove one or more columns (e.g., containing attribute data) that include an intolerable proportion of missing values.

In one or more embodiments, the system performs missing data imputation on each of the matrices, as shown by the example data imputation process 800 of FIG. 8. Missing data imputation may refer to the replacement of missing data 805 with a replacement value 810 that is defined by non-missing values within the same set (e.g., values within the same column). In at least one embodiment, the system performs a "fill-forward" operation for to impute each missing value 805 of a matrix, where the fill-forward operation may include, but is not limited to: identifying an entry for a missing value 805 in a matrix; identifying a value of a nearest, previous, non-missing entry (e.g., a most-recently preceding, non-missing entry in a column) to be a replacement value 810; and replacing the missing value entry with the value of the identified, previous entry (i.e., the replacement value 810). Accordingly, the system may replace one or more (e.g., all) missing values 805 (aside from the value in the first entry of each column) in each matrix with respective replacement values 810 given by the value of the nearest preceding entry.

In various embodiments, if the first entry of a column is a missing value 805, the system performs a lambda function to replace the missing value 805 with a time series median of the proceeding entries in the column (e.g., as is shown with respect to FIG. 8), which may then be set as the replacement value 810. This lambda function is given by the equation:

$$\text{Apply\_Lambda} = \text{PeakAccelContFOL.apply}(\text{lambda } x{:}x.\text{fillna}(x.\text{median}( )), \text{axis}=0)|$$

Thus, the system performs imputation on up to all missing values 805 in each matrix, thereby resulting in elimination (by replacement) of up to all missing values 805 therein.

In one or more embodiments, following missing data imputation, the system adds an additional column to each matrix. In at least one embodiment, cells of the additional column are numbered from 1 to n, where n may be a number of each matrix. Thus, the system modifies each matrix to include a column with sequential numbering. In various embodiments, each matrix contains one or more sets of time series data, where the system may define a set as a particular number of sequential data points in a column (e.g., where the particular number may be referred to as a set length). For example, the system may define a set as 24 sequential data points in a column. In one or more embodiments, the system defines a dictionary object of features to create for the one or sets of time series data of each column (of each matrix). In at least one embodiment, a feature of the dictionary object is a statistical median. Thus, the system may calculate and record a median value for each of the one or more time series of data. For example, the system, for a matrix including 3 columns of 326 data points each (e.g., 326 hours of data, which is equivalent to 14 sets of time series data), calculates and records 14 median values.

In various embodiments, the system computes one or more features of the dictionary object (including median values) by executing a loop of executable machine code. In at least one embodiment, for each column of each matrix, the system replaces sets of time series data with a corresponding calculated median value. Thus, the system may condense data of each matrix to one or more values (e.g., a median value) that summarize each day with a statistic that is robust to outliers. For example, vibration data typically contains a large proportion of outlier values (e.g., from sensor noise, etc.); therefore, the system mitigates the proportion of outlier values by computing a median value of each day's vibration data. In one or more embodiments, the system may verify data integrity by determining the dimensions of each matrix and confirming that the dimensions are identical to each other.

FIG. 9 shows a diagram illustrating an example data imputation process 900 for generating a penalty matrix 905 that supports analyzing machine performance in accordance with aspects of the present disclosure. In various embodiments, the system calculates day-to-day sequential differences between median values within each column of each input matrix 910 (e.g., as obtained following the imputation process described with reference to FIG. 8 and/or the other matrices described herein may be used as inputs). Thus, in at least one embodiment, the system compares the magnitude of a first and a second median value, where the first and second median values are sequentially adjacent to each other in the input matrix 910. In one or more embodiments, if the second median value is greater than the first median value, the system replaces the second median value with a 1 in the penalty matrix 905. In at least one embodiment, if the second median value is less than the first median value, or if the values are equal, the system replaces the second value with a 0 (zero) the penalty matrix 905. Thus, the system may simplify day to day and asset to asset comparisons by reducing sensor data to a binary classification convention (e.g., where a 1 indicates increasing vibration behavior and a 0 indicates decreasing vibration behavior or no change). In one embodiment, following comparison to a second value, the system may automatically replace the first value in each column of the penalty matrix 905 with a 0.

In various embodiments, following difference calculation and the process 900, each penalty matrix 900 includes n−1 rows and n columns, where each entry of each penalty matrix 900 is either 0 or 1. Thus, as is shown with respect to FIG. 9, the system may replace up to all values in penalty matrices 900 with either a 1 or a 0, where a 1 may represent a vibration "penalty" (e.g., increasing vibration) and a 0 may represent decreasing or constant vibration.

In some embodiments, a penalty refers to a status and/or value of a sensor metric (e.g., overall vibration, peak acceleration, etc.) which may contribute to or be indicative of sub-optimal machine performance. Thus, a sensor that presents a multitude of penalties over a given period may indicate sub-optimal machine performance (e.g., as a result of one or more machine elements that are degrading or are otherwise functioning atypically). In various embodiments, the present system aggregates and refines sensor data to compute penalties that may be evaluated (e.g., by a facility manager, by system, etc.) to assess performance of one or more machines (e.g., that are associated with the sensor data). For example, a relatively higher aggregate penalty (e.g., satisfying or exceeding a corresponding aggregate penalty threshold) may indicate that an anomaly has occurred for the respective sensor and/or machine.

Figure 10:
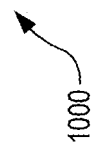
FIG. 10 shows an example combined penalty matrix that supports analyzing machine performance in accordance with aspects of the present disclosure.

FIG. 10 shows an example combined penalty matrix 1000 that supports analyzing machine performance in accordance with aspects of the present disclosure. In at least one embodiment, to aggregate sensor data, as similarly described with reference to FIG. 9, the system sums the above described matrices (all values of each having been replaced with 1's and 0's) to generate a combined penalty matrix 1000. The example combined penalty matrix 1000 shown in FIG. 10 may include a column showing this combined (e.g., aggregated) penalty.

Figure 11:
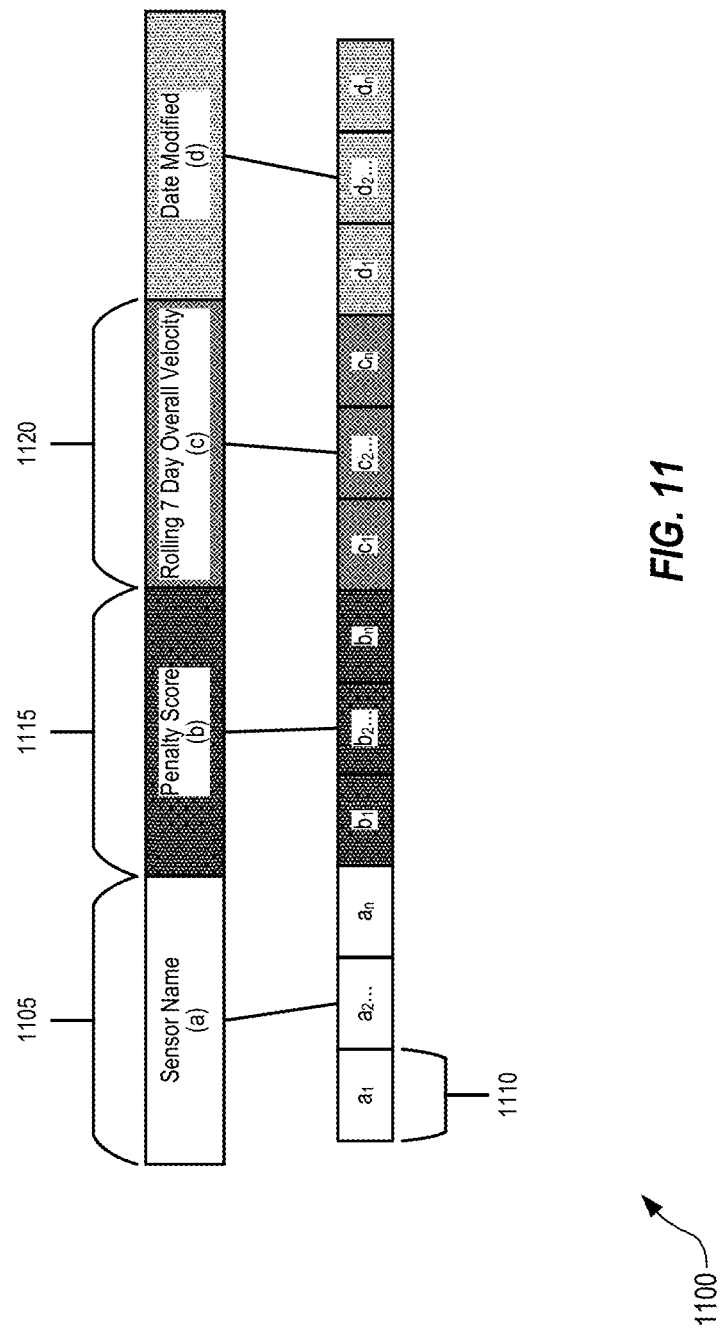
FIG. 11 shows a diagram illustrating an example data organization schema that supports analyzing machine performance in accordance with aspects of the present disclosure.

FIG. 11 shows a diagram illustrating an example data organization schema 1100 that supports analyzing machine performance in accordance with aspects of the present disclosure. The example organization schema 1100 shows four data frames 1105, where each data frame 1105 may include one or more data entries 1110. The example organization schema 1100 of FIG. 11 is illustratively shown as including four data frames for four respective categories of information, but it is contemplated that the organization schema 1100 may include any number of data frames 1105 (e.g., greater or fewer than the four shown in FIG. 11). Likewise, the example organization schema 1100 of FIG. 11 is illustratively shown as including three data entries 1110 per data frame, these three data entries 1110 having respective indices of "1," "2, . . . " and "n." This signifies that although three data entries 1110 are shown for each data frame 1105 in this example, each data frame 1105 may include any number from 1 to n data entries 1110.

Accordingly, penalty scores (or, combined penalty scores) may be aggregated in a data frame 1115, shown here as including penalty score data entries. As such, each index of the combined penalty matrix may be the sum of the corresponding indices of each segregated matrix.

In various embodiments, the system segregates the most recent fifteen days' worth of rows of the combined matrix. In at least one embodiment, the system calculates a seven-day rolling mean from up to all entries in the combined matrix. In one or more embodiments, the system creates an additional column in segregated rows and appends the computed seven-day rolling mean to each row in the additional column.

Accordingly, this segregated data for the seven-day rolling average (e.g., arithmetic mean, median, or the like) averaging may be aggregated in a data frame 1120. For example, as shown by the example organization schema 1100, the data frame 1120 may be configured to store data entries indicative of a rolling seven-day overall velocity. In other examples, the data frame 1120 may store data for seven-day rolling averages associated with any of the other parameters discuss or contemplated herein.

In one or more embodiments, the system adds a change tracking column to each matrix. In at least one embodiment, the column may be a "Date Modified" column, where each entry within the column includes a date that indicates when associated sensor data (e.g., entries in the same row) were obtained. Thus, the system may provide a data-dating mechanism for readily tracking machine performance on a day to day basis. In various embodiments, the system adds a facility column, where each entry in the facility column indicates a particular facility from which associated sensor data (e.g., entries in the same row) was sourced. In at least one embodiment, following conclusion of computational and column creation processes, the system performs a standardization operation on each matrix that removes any special characters present therein.

Thus, the system and/or a facility manager may readily identify sensors (e.g., each represented by a row in the combined matrix) that are recording anomalous vibration. In one or more embodiments, the system removes rows (e.g., sensors) from the combined matrix that present a seven-day rolling mean that is less than a predetermined value, thus remaining sensors may be considered to be those sensors recording anomalous vibration.

FIG. 12 shows an example master spreadsheet 1200 that supports analyzing machine performance in accordance with aspects of the present disclosure. In various embodiments, the system generates a master spreadsheet 1200 (as is shown in the example of FIG. 12) by performing a union of each of one or more combined matrices (each combined matrix representing, e.g., a particular industrial machine in a facility). In one or more embodiments, the master spreadsheet 1200 may provide columns including, but not limited to: a report date, a facility name, a sensor name, a rolling mean (e.g., rolling seven-day mean of overall velocity), a rank (e.g., expressed as a numeral where a rank of "1" identifies a sensor as most anomalous out of sensors in the master spreadsheet 1200), and/or modified date and time, among other like categories described or contemplated herein.

In various embodiments, the system organizes the master spreadsheet 1200 by ranking sensors therein in order of descending vibrational anomaly. In at least one embodiment, the system may perform ranking by sorting (e.g., in a combined penalty matrix or in the master spreadsheet 1200) sensors by sum penalty (in descending order). For example, a first entry in the master spreadsheet 1200 may be a sensor that was determined to record a highest value of vibrational anomaly (e.g., as indicated by a highest combined penalty). In at least one embodiment, penalty ranking of one or more sensors (e.g., of one or more assets in a facility) may allow for relatively rapid identification of potential performance issues occurring in one or more assets (e.g., by a facility operator).

In at least one embodiment, the system may present a facility manager, or the like, with a spreadsheet (e.g., the master spreadsheet 1200 as is shown and described with respect to FIG. 12) that documents and ranks one or more sensors (e.g., of one or more industrial machines) in a particular facility that are recording anomalous vibration. By reporting and ranking (e.g., in order of descending vibrational anomaly) one or more sensors of a particular machine that are recording anomalous vibration, the system, by way of the facility manager, may permit continuous and real-time assessment of sub-optimal machine performance at a facility-wide scale.

In at least one embodiment, the system may automatically (e.g., autonomously), or, e.g., in response to receipt of a command, generate a list of industrial machines (e.g., in a particular facility) that are reporting or have reported anomalous vibration. For example, the system may produce a pivot table of machine names (e.g., parsed from the concatenations of the master spreadsheet 1200, which may function as sensor names) and penalties (e.g., or any metric indicating anomalous vibration). In the same example, the system may identify one or more machines with a number of outlier sensors (e.g., sensors with a total number of penalties above a predetermined penalty threshold) that that satisfies or exceeds a predetermined outlier sensor threshold. Continuing the example, the system may generate and transmit (e.g., to a facility operator, a server, etc.) a report including concatenations (or parsed information thereof) of each of the one or more identified machines. Thus, in at least one embodiment, the system may automatically generate and report one or more machines with sensors determined to be reporting anomalous vibration.

In various embodiments, the system may generate one or more visualizations sourced from the master spreadsheet 1200 and identified machines and/or sensors experiencing anomalous vibration. For example, the system may produce a dashboard, such as a Tableau® dashboard, that provides visualizations of vibration analyses for one or more sensors, one or more industrial machines and/or one or more facilities. Thus, in at least one embodiment, the system may analyze vibration data from one or more sensors of one or more industrial machines in a facility, identify and track vibration anomalies simultaneously for one or more industrial machines in a facility, and report (e.g., via spreadsheets, visualizations, etc.) one or more industrial machines in a facility that may be deviating from optimal performance (e.g., as indicated by anomalous vibration).

Figure 13:
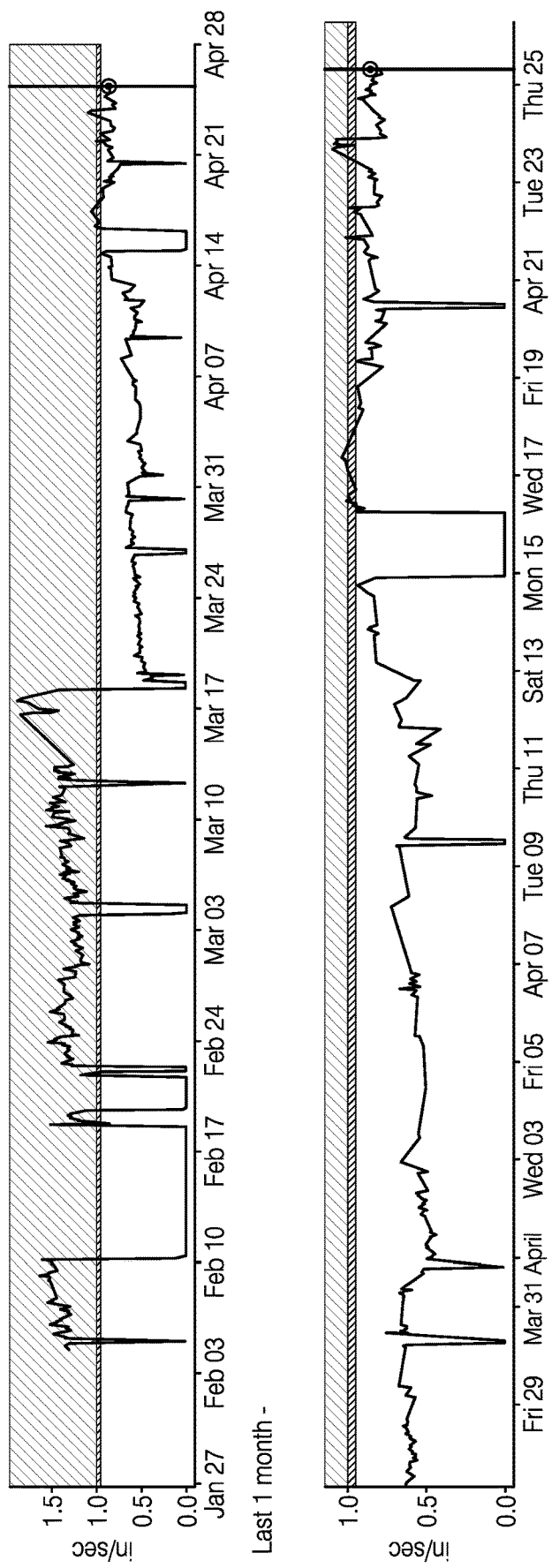
FIG. 13 shows an example sensor measurement chart that supports analyzing machine performance in accordance with aspects of the present disclosure.

FIG. 12 shows an example master spreadsheet 1200 that supports analyzing machine performance in accordance with aspects of the present disclosure. In various embodiments, the FIG. 13 an example sensor measurement chart 1300 that supports analyzing machine performance in accordance with aspects of the present disclosure. The sensor measurement chart 1300 shown in FIG. 13 may show a level of overall vibration (e.g., showing a sequence of measurements in in/s) over a first duration of time (e.g., three months) and a second duration of time (e.g., one month). The sensor measurement chart 1300 may be an example of measurements taken from a combustion fan, and similar charts may show measurements from other devices.

In the example sensor measurement chart 1300, the shaded areas may represent "static alarms," that is, a threshold level for an upper control limit. The example sensor measurement chart 1300 shows that the asset may run above the threshold for the upper control limit for a period of time (e.g., a relatively short period of time) before failing. However, operating at or above the upper control limit is not optimal and will lead to a failure. According to the techniques described herein, a user (e.g., one or more remote process engineers) may be alerted before the asset is above the upper control limit. The example sensor measurement chart 1300 shows a situation in which measurements show levels that are only briefly above the upper control limit, which may be likely to be a false positive. This is shown by the sensor measurement chart 1300 in late April (e.g., at April 27). Because the techniques described herein rely on the sequential increases in the trend values, rather than just a brief increase, this period may be identified as having a high probability of being an anomaly. Accordingly, remote process engineers may alert the site and prevent this asset from staying above the upper control limit and failing.

Figure 14:
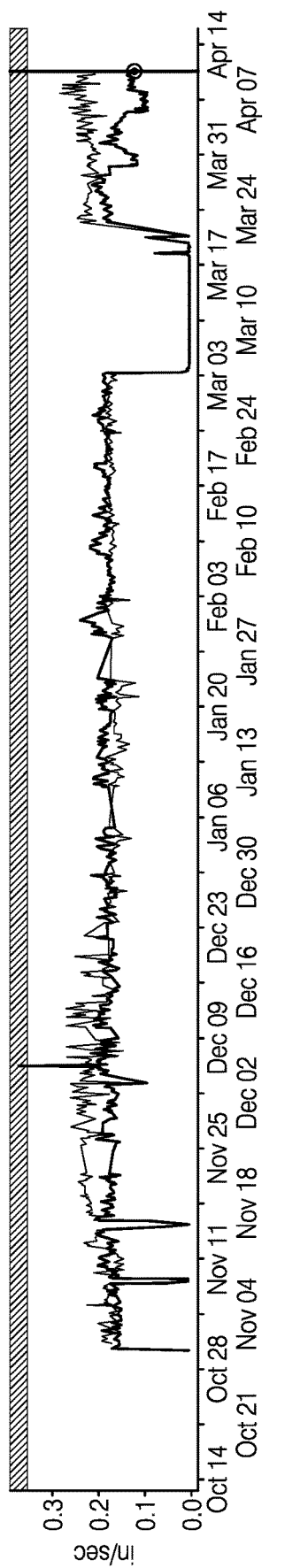
FIG. 14 show an example sensor measurement chart that supports analyzing machine performance in accordance with aspects of the present disclosure.

FIG. 14 an example sensor measurement chart 1400 that supports analyzing machine performance in accordance with aspects of the present disclosure. The sensor measurement chart 1400 shown in FIG. 14 may show a level of overall vibration (e.g., showing a sequence of measurements in in/s) over a duration of time (e.g., several months). The sensor measurement chart 1400 may be an example of measurements taken from a hydraulic drive pump, and similar charts may show measurements from other devices.

In the example sensor measurement chart 1400 of FIG. 14, the techniques described herein may determine that the hydraulic drive pump (e.g., identified, according to various keys, as the North Main Stoker Bark Surge Bin Hydraulic Drive #3 Pump in the Power Boiler area) to have a potential for failure. According to the techniques described herein, a sequential increase in trend values (e.g., velocity) may be detected, and users (e.g., remote engineers) may be alerted well before the asset's trend values are above the static alarm limit. Users (e.g., subject matter experts, such as vibration analysts) may analyze the data upon being alerted, and may determine this catch to be a true positive (rather than a false positive) with sufficient lead time in alert status to take measures to correct the problem and prevent a potentially serious failure.

These and other aspects, features, and benefits of the claimed invention(s) are apparent from the following detailed written description of the preferred embodiments and aspects taken in conjunction with the following drawings, although variations and modifications thereto may be effected without departing from the spirit and scope of the novel concepts of the disclosure.

What is claimed is:

1. A method for analyzing machine performance, comprising:
receiving vibration data from a sensor associated with a machine;
determining that a variation in the vibration data for the sensor satisfies a threshold by determining a replacement value representing a subset of the vibration data within a time interval, and comparing the replacement value with the threshold;
determining an occurrence of an anomaly at the sensor based on the variation satisfying the threshold; and
transmitting a report including an indication of the sensor associated with the machine based on the occurrence of the anomaly.

2. The method of claim 1, the collecting vibration data from a sensor including collecting a plurality of vibration data each from a sensor of a plurality of sensors;
the method further comprising: aggregating the vibration data for each of the plurality of sensors according to one or more of: a sensor type, a corresponding machine, a corresponding facility, or a combination thereof;
wherein determining that the variation in the vibration data satisfies the threshold is based on the aggregated vibration data.

3. The method of claim 1, further comprising:
collecting the vibration data at discrete intervals.

4. The method of claim 1, wherein the receiving includes determining one or more of: a peak velocity value, a peak acceleration value, an overall root mean square value, an overall vibration value, or a combination thereof.

5. The method of claim 1, the collecting vibration data from a sensor including collecting a plurality of vibration data each from a sensor of a plurality of sensors;
the method further comprising: correlating the plurality of vibration data with respective ones of the sensors based on a key associated with each of the plurality of vibration data.

6. The method of claim 1, further comprising:
determining a missing value from the collected vibration data, wherein determining that the variation in the vibration data satisfies the threshold is based on the missing value.

7. The method of claim 1, the vibration data being a series of vibration data values collected from the sensor;
wherein determining that the variation in the vibration data for the sensor satisfies the threshold comprises:
determining a number of discrete vibration data values in the series that exceed a previous vibration data value in the series; and
comparing the number of discrete vibration data values with the threshold.

8. The method of claim 1, the collecting vibration data from a sensor including collecting vibration data from a plurality of sensors each associated with one or more machines;
wherein transmitting the indication comprises: filtering a list of the one or more machines based on determining that anomaly has not occurred at one or more respective sensors associated with the one or more respective machines.

9. The method of claim 1, the collecting vibration data from a sensor including collecting vibration data from a plurality of sensors each associated with one or more machines;
wherein transmitting the indication comprises: ranking a list of the one or more machines based on vibration data associated with each of the one or more respective machines.

10. The apparatus of claim 1, the replacement value being a mean of the subset of vibration data.

11. The apparatus of claim 1, the replacement value being a median of the subset of vibration data.

12. The method of claim 5, wherein:
the key comprises an indication of a location of a sensor, a sensor function, or both.

13. The method of claim 6, further comprising:
transmitting an indication of the missing value.

14. The method of claim 6, further comprising:
determining a respective completeness percentage based on determining the missing value; and
filtering the vibration data based on the respective completeness percentage for the vibration data, wherein determining that the variation in the vibration data satisfies the threshold is based on the completeness percentage.

15. The method of claim 6, further comprising:
imputing a value in place of the missing value based on the collected vibration data, wherein determining that the variation in the vibration data satisfies the threshold is based on the imputed value.

16. The method of claim 14, wherein:
filtering the vibration data is based on the respective completeness percentage for the vibration data not satisfying a completeness threshold.

17. A method for analyzing machine performance, comprising:
receiving vibration data from a sensor associated with a machine;
determining that a variation in the vibration data for the sensor satisfies a threshold by:
determining a missing value that is missing from the collected vibration data, and
imputing an input value in place of the missing value, wherein determining that the variation in the vibration data satisfies the threshold is based on the imputed value;
determining an occurrence of an anomaly at the sensor based on the variation satisfying the threshold; and
transmitting a report including an indication of the sensor associated with the machine based on the occurrence of the anomaly.

18. An apparatus for analyzing machine performance, comprising:
a processor;
memory coupled with the processor; and
instructions stored in the memory and executable by the processor to cause the apparatus to:
receive vibration data from a sensor associated with a machine;
determine that a variation in the vibration data the sensor satisfies a threshold by determining a replacement value representing a subset of the vibration data within a time interval, and comparing the replacement value with the threshold;
determine an occurrence of an anomaly at sensor based on the variation satisfying the threshold; and
transmit a report including an indication the sensor associated with the machine based on the occurrence of the anomaly.

19. The apparatus of claim 18, the receive vibration data from a sensor including collect a plurality of vibration data each from a sensor of a plurality of sensors; wherein the instructions are further executable by the processor to cause the apparatus to:
aggregate the vibration data for each of the plurality of sensors according to one or more of: a sensor type, a corresponding machine, a corresponding facility, or a combination thereof;
wherein determining that the variation in the vibration data satisfies the threshold is based on the aggregated vibration data.

20. The apparatus of claim 18, wherein the instructions are further executable by the processor to cause the apparatus to:
collect the vibration data at discrete intervals.

21. The apparatus of claim 18, further comprising computer readable instructions that when executed by the processor cause the apparatus to determine:
one or more of: a peak velocity value, a peak acceleration value, an overall root mean square value, an overall vibration value, or a combination thereof.

22. The apparatus of claim 18, the receive vibration data from a sensor including collect a plurality of vibration data each from a sensor of a plurality of sensors; wherein the instructions are further executable by the processor to cause the apparatus to:
correlate the plurality of vibration data with respective ones of the plurality of sensors based on a key associated with each of the plurality of vibration data.

23. The apparatus of claim 18, wherein the instructions are further executable by the processor to cause the apparatus to:
determine a missing value from the collected vibration data, wherein determining that the variation in the vibration data satisfies the threshold is based on the missing value.

24. The apparatus of claim 18, the vibration data being a series of vibration data collected from the sensor; wherein the instructions to determine that the variation in the vibration data for the sensor satisfies the threshold are further executable by the processor to cause the apparatus to:
determine a number of discrete vibration data value in the series that exceed a previous vibration data value in the series; and
compare the number of discrete vibration data with the threshold.

25. The apparatus of claim 18, the vibration data including a plurality of vibration data each from a sensor of a plurality of sensors; wherein the instructions to transmit the indication are further executable by the processor to cause the apparatus to:
filter a list of the one or more machines based on determining that anomaly has not occurred at one or more respective sensors associated with the one or more respective machines.

26. The apparatus of claim 18, the vibration data including a plurality of vibration data each from a sensor of a plurality of sensors; wherein the instructions to transmit the indication are further executable by the processor to cause the apparatus to:
rank a list of the one or more machines based on vibration data associated with each of the one or more respective machines.

27. The apparatus of claim 18, the replacement value being a mean of the subset of vibration data.

28. The apparatus of claim 18, the replacement value being a median of the subset of vibration data.

29. The apparatus of claim 22, wherein:
the key comprises an indication of a location of a sensor, a sensor function, or both.

30. The apparatus of claim 23, wherein the instructions are further executable by the processor to cause the apparatus to:
transmit an indication of the missing value.

31. The apparatus of claim 23, wherein the instructions are further executable by the processor to cause the apparatus to:
determine a respective completeness percentage based on determining the missing value; and
filter the vibration data based on the respective completeness percentage for the vibration data, wherein determining that the variation in the vibration data satisfies the threshold is based on the completeness percentage.

32. The apparatus of claim 23, wherein the instructions are further executable by the processor to cause the apparatus to:
impute a value in place of the missing value based on the collected vibration data, wherein determining that the variation in the vibration data satisfies the threshold is based on the imputed value.

33. The apparatus of claim 31, wherein:
filtering the vibration data is based on the respective completeness percentage for the vibration data not satisfying a completeness threshold.

34. An apparatus for analyzing machine performance, comprising:
a processor;
memory coupled with the processor; and
instructions stored in the memory and executable by the processor to cause the apparatus to:
impute a value in place of a missing value based on the received vibration data, wherein determining that the variation in the vibration data satisfies the threshold is based on the imputed value;
determine an occurrence of an anomaly at the sensor based on the variation satisfying the threshold; and
transmit a report including an indication of the sensor associated with the machine based on the occurrence of the anomaly.

* * * * *